United States Patent
Zhang et al.

(10) Patent No.: US 9,360,670 B2
(45) Date of Patent: Jun. 7, 2016

(54) DISPLAY METHOD AND DISPLAY DEVICE FOR AUGMENTED REALITY

(71) Applicants: Beijing Lenovo Software Ltd., Haidian District, Beijing (CN); Lenovo (Beijing) Co., Ltd., Haidian District, Beijing (CN)

(72) Inventors: Liuxin Zhang, Beijing (CN); Xu Zhao, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 38 days.

(21) Appl. No.: 14/103,943

(22) Filed: Dec. 12, 2013

(65) Prior Publication Data

US 2014/0160163 A1 Jun. 12, 2014

(30) Foreign Application Priority Data

Dec. 12, 2012 (CN) .......................... 2012 1 0537403

(51) Int. Cl.
*G09G 5/00* (2006.01)
*G02B 27/01* (2006.01)
(Continued)

(52) U.S. Cl.
CPC .............. *G02B 27/017* (2013.01); *G06F 3/012* (2013.01); *G06T 11/00* (2013.01); *H04N 13/044* (2013.01); *G02B 13/007* (2013.01);
(Continued)

(58) Field of Classification Search
CPC ................ G02B 2027/014; G02B 2027/0138; G02B 2027/0127; G02B 27/017; H04N 13/044; H04N 13/007; G06T 11/00; G06F 3/012

USPC ......................................................... 345/633
See application file for complete search history.

(56) References Cited

U.S. PATENT DOCUMENTS 5,766,016 A * 6/1998 Sinclair et al. ................ 434/262
2007/0236514 A1 * 10/2007 Agusanto et al. ............. 345/646

(Continued)

FOREIGN PATENT DOCUMENTS

| CN | 101101505 A | 1/2008 |
|---|---|---|
| CN | 102395036 A | 3/2012 |
| WO | WO 2012/158323 | 11/2012 |

OTHER PUBLICATIONS

Robert T. Azuma, A Survey of Augmented Reality, Aug. 1997, Presence, vol. 6, No. 4, p. 355-385.*

(Continued)

*Primary Examiner* — Barry Drennan
*Assistant Examiner* — Robert Craddock
(74) *Attorney, Agent, or Firm* — Brinks Gilson & Lione; G. Peter Nichols

(57) ABSTRACT

A display device includes a first display unit, a second display unit, and a first image acquisition unit, a second image acquisition unit, an image processing unit, and an image output unit. A display method includes acquiring a first image and a second image by first image acquisition unit and second image acquisition unit respectively, both of the first image and the second image include the target image; determining a display information in accordance with the target image; determining a first display position in the first image and a second display position in the second image in accordance with the target image; displaying the first display image corresponding to the display information at the first display position and the second display image corresponding to the display information at the second display position.

19 Claims, 7 Drawing Sheets

(51) Int. Cl.
*G06F 3/01* (2006.01)
*G06T 11/00* (2006.01)
*H04N 13/04* (2006.01)
*G02B 13/00* (2006.01)

(52) U.S. Cl.
CPC .. *G02B 2027/014* (2013.01); *G02B 2027/0127* (2013.01); *G02B 2027/0138* (2013.01)

(56) References Cited

U.S. PATENT DOCUMENTS

| | | | |
|---|---|---|---|
| 2010/0103196 A1* | 4/2010 | Kumar et al. | 345/633 |
| 2011/0029903 A1* | 2/2011 | Schooleman et al. | 715/764 |
| 2011/0164163 A1* | 7/2011 | Bilbrey et al. | 348/333.01 |
| 2011/0213664 A1* | 9/2011 | Osterhout et al. | 705/14.58 |
| 2012/0256917 A1* | 10/2012 | Lieberman et al. | 345/419 |
| 2013/0083011 A1* | 4/2013 | Geisner et al. | 345/419 |

OTHER PUBLICATIONS

Chinese First Office Action with English Translation for related Application No. 201210537403.0 dated Apr. 8, 2015, 15 pages.
Second Office Action dated Oct. 26, 2015 out of corresponding Chinese priority Application No. 201210537403.0 (13 pages including English translation).
Third Office Action dated Apr. 8, 2016 out of corresponding Chinese priority Application No. 201210537403.0 (12 pages including English translation).

* cited by examiner

S510 — adding the first display image at the first display position in the first image to generate a first synthesized image, adding the second display image at the second display position in the second image to generate a second synthesized image S520 — extracting the rest of image excluding the first image from the first synthesis image to generate the first tagging image, extracting the rest of the image excluding the second image from the second synthesis image to generate the second tagging image S530 — displaying the first tagging image on the first display unit, the tagging image on the second display unit

Fig. 5

S610 — adding, the first display image at the first display position in the first image template to generate a first tagging image S620 — displaying the first tagging image on the first display unit, and displaying the second tagging image on the second display unit

710 first display unit satisfying a predetermined transmittance

720 second display unit satisfying a predetermined transmittance

730 first image acquisition unit set corresponding to the first display unit

740 second image acquisition unit set corresponding to the second display unit

750 image processing unit

760 image output unit

Fig. 7

DISPLAY METHOD AND DISPLAY DEVICE FOR AUGMENTED REALITY

This application claims priority to Chinese patent application No. 201210537403.0 filed on Dec. 12, 2012, the entire contents of which are incorporated herein by reference.

BACKGROUND

The present invention relates to a field of augmented reality display, and more particularly to an augmented reality display method and device.

Augmented Reality (hereafter, simply referred to as AR) is a technology, which applies virtual information to real world, overlaps the virtual information and a real environment in real time, and performs interactions with the use of a computer, also known as mixed reality. AR provides information that cannot be directly conceived from real world, so as to expand our perception.

Early AR systems employ a desktop computer or a work station as a system-operating platform, and employ a perspective head-mounted display as a fusion display device. These systems are only applicable for laboratory environments and not applicable for outdoor environments, since being lack of good mobility.

In recently years, with the development of mobile computing devices and mobile Internet, AR technology has become more widely used on mobile devices. For example, it is possible to see related information about peripheral objects in real time with the use of an AR application on a smartphone, as shown in FIG. 1.

The application of AR technology on the mobile devices is according to the principles of: 1) obtaining environmental image information around a mobile device by a camera of the mobile device; 2) recognizing various objects in the environmental image with the use of image recognition technology; 3) extracting, according the recognition result, relevant additional information of the various objects from an existing information library, and tagging the additional information on the real environmental images where the various objects locate.

In this kind of AR applications, since all of the additional information of all the recognized objects is tagged on the same two dimensional image plane and is lack of necessary three-dimensional depth information, for scenes with great difference between the depths of objects, the tagged additional information might be appeared to be lack of realism because of no depth. As shown in FIG. 2, there are differences of depth between various buildings in real environment and all the tagged AR information (black semi-transparent text block) is on the same image plane, without depth information. There exists ambiguity about correspondences between buildings and respective AR information, and it is difficult to find the corresponding building with AR information, which means it is hard to distinguish which AR information belongs to which building, and it is lack of realism.

Specifically, as for an AR application in a see-through wearable glasses device (such as GOOGLE GLASS (a type of wearable technology with an optical head-mounted display)), since various objects that are seen-through glasses are real instead of object images acquired by cameras, it has real depths among various objects. However, all the AR information it can present is on the same image plane, and is lack of depth information.

Thus, there is a demand for an augmented reality information tagging method suitable for wearable glasses devices, which enables AR information of objects to be overlapped on real objects correctly, and enables the same depth as the real object to be provided.

SUMMARY

In the light of the above-described problems, the present application is made. The present application intends to provide a display method and device, which enable to provide a user with 3D information tag in a AR information tagging application.

According to one aspect of the present application, it provides a display method, applied to an electronic device. The electronic device includes: a first display unit, which satisfies a predetermined transmittance; a second display unit, which satisfies a predetermined transmittance; a first image acquisition unit, which is set corresponding to the first display unit; a second image acquisition unit, which is set corresponding to the second display unit, wherein when the electronic device is put on the user, the first display unit locates within a viewable area of the user's first eye, the second display unit locates within the viewable area of the user's second eye, and the first image acquisition unit and the second image acquisition unit have an overlapping acquisition area, the overlapping acquisition area is the overlapping area of the first image acquisition area of the first image acquisition unit and the second image acquisition area of the second image acquisition unit, the display method includes: acquiring a first image of the first image acquisition area with the use of first image acquisition unit, the first image including a target image in the overlapping area, and the target image corresponding to a target object; acquiring a second image of the second image acquisition area with the use of second image acquisition unit, the second image including the target image in the overlapping area; determining a display information in accordance with the target image; determining a first display position in the first image in accordance with the target image; determining a second display position in the second image in accordance with the target image; displaying the first display image corresponding to the display information at the first display position of the first display unit and displaying the second display image corresponding to the display information at the second display position of the second display unit at the same time, so as to enable the user to perceive the 3D display image corresponding to the display information while viewing through the first display unit by the first eye and viewing through the second display unit by the second eye.

Preferably, in the display method, displaying the first display image corresponding to the display information at the first display position of the first display unit and displaying the second display image corresponding to the display information at the second display position of the second display unit at the same time includes: adding the first display image at the first display position in the first image to generate a first synthesized image, adding the second display image at the second display position in the second image to generate a second synthesized image; extracting image excluding the first image from the first synthesis image to generate the first tagging image, extracting image excluding the second image from the second synthesis image to generate the second tagging image; and displaying the first tagging image on the first display unit, and displaying the tagging image on the second display unit.

Preferably, in the display method, displaying the first display image corresponding to the display information at the first display position of the first display unit and displaying the second display image corresponding to the display information at the second display position of the second display unit at the same time includes: adding the first display image at the first display position in the first image template to generate a first tagging image, in which the size of a pixel matrix on the first image template is the same as the size of the pixel matrix on the first image; adding the second display image at the second display position in the second image template to generate a second tagging image, in which the size of the pixel matrix on the second image template is the same as the size of the pixel matrix on the second image; and displaying the first tagging image on the first display unit, and displaying the second tagging image on the second display unit.

Preferably, in the display method, according to the shape of the target image in the first image and the shape of the target image in the second image, the shapes of the first display image and the second display image are adjusted adaptively, in order to enable the user to perceive that the first display image and the second display image are well attached to the target image with 3D display effect.

Preferably, in the display method, the first display unit is a first lens, the second display unit is a second lens, displaying the first tagging image on the first display unit includes projecting the first tagging image onto the first display unit; displaying the second tagging image on the second display unit includes projecting the second tagging image onto the second display unit.

According to another aspect of the present application, it provides a display device, including: a first display unit, which satisfies a predetermined transmittance; a second display unit, which satisfies a predetermined transmittance; a first image acquisition unit, which is set corresponding to the first display unit; a second image acquisition unit, which is set corresponding to the second display unit; an image processing unit; an image output unit, wherein when the display device is put on by the user, the first display unit locates within a viewable area of the user's first eye, the second display unit locates within the viewable area of the user's second eye, and the first image acquisition unit and the second image acquisition unit have an overlapping acquisition area, the overlapping acquisition area is the overlapping area of the first image acquisition area of the first image acquisition unit and the second image acquisition area of the second image acquisition unit, wherein, the first image acquisition unit acquires a first image of the first image acquisition area, the first image includes a target image in the overlapping area, and the target image corresponds to a target object; the second image acquisition unit acquires a second image of the second image acquisition area, the second image including the target image in the overlapping area; wherein, the image processing unit determines a display information in accordance with the target image; determining a first display position in the first image in accordance with the target image and determining a second display position in the second image in accordance with the target image; the image output unit displays the first display image corresponding to the display information at the first display position of the first display unit and displays the second display image corresponding to the display information at the second display position of the second display unit at the same time, so as to enable the user to perceive the 3D display image corresponding to the display information while viewing through the first display unit by the first eye and viewing through the second display unit by the second eye.

Preferably, in the display device, the image processing unit adds the first display image at the first display position in the first image to generate a first synthesized image, adds the second display image at the second display position in the second image to generate a second synthesized image, and extracts image excluding the first image from the first synthesis image to generate the first tagging image, extracts image excluding the second image from the second synthesis image to generate the second tagging image.

Preferably, in the display device, the image processing device adds the first display image at the first display position in the first image template to generate a first tagging image, in which the size of a pixel matrix on the first image template is the same as the size of the pixel matrix on the first image; the image processing device adds the second display image at the second display position in the second image template to generate a second tagging image, in which the size of the pixel matrix on the second image template is the same as the size of the pixel matrix on the second image.

Preferably, in the display device, according to the shape of the target image in the first image and the shape of the target image in the second image, the image processing unit adaptively adjusts the shapes of the first display image and the second display image.

Preferably, in the display device, the first display unit is a first lens, the second display unit is a second lens, the image output unit projects the first tagging image onto the first display unit, and projects the second tagging image onto the second display unit.

Preferably, the first display unit and the second display unit are transparent display device, wherein, the first display unit is a first lens, the second display unit is a second lens, the image output unit outputs the first tagging image to the first display unit, and outputs the second tagging image to the second display unit.

Preferably, the display device is a wearable glass device.

Preferably, in the display method and the display device, the first image acquisition unit is positioned above the first display unit, the second image acquisition unit is positioned above the second display unit, and the first image acquisition unit and the second image acquisition unit are symmetric with respect to the center of the electronic device; the first image acquisition unit is positioned below the first display unit, the second image acquisition unit is positioned below the second display unit, and the first image acquisition unit and the second image acquisition unit are symmetric with respect to the center of the electronic device; the first image acquisition unit is on the left side of the first display unit, the second image acquisition unit is on the right side of the second display unit, and the first image acquisition unit and the second image acquisition unit are symmetric with respect to the center of the electronic device; or the first image acquisition unit is on the right side of the first display unit, the second image acquisition unit is on the left side of the second display unit, and the first image acquisition unit and the second image acquisition unit are symmetric with respect to the center of the electronic device, wherein, the viewable area of the first eye is approximately overlapping with the first image acquisition area, and the viewable area of the second eye is approximately overlapping with the second image acquisition area.

Preferably, in the display method and the display device, the first display position and the second display position correspond to the same geometric characteristic point of the target object.

Preferably, in the display method and the display device, the first display position and the second display position correspond to the same target area with as the same depth as the target objects.

Preferably, in the display method and the display device, the first display image and the second display image have the same size, and have the same display content.

The display method and the display device according to the embodiments of the present application can advantageously provide the user with 3D information tags having depths, so that the user can easily recognize the tag information is the tag information of which object, without confusion, which improves information tagging technology of AR.

BRIEF DESCRIPTION OF THE DRAWINGS

The features and advantages of the embodiments of the present application will be more apparent and more easily understood by reference to the following description of the embodiments of the present application taken in conjunction with the accompany drawings in which:

FIG. 5 illustrates an exemplary implementation of Step S430 in FIG. 4, according to the embodiments of the present application;

FIG. 6 illustrates another exemplary implementation of Step S430 in FIG. 4, according to the embodiments of the present application;

FIG. 7 illustrates the block diagram of the display device according to the embodiments of the present application;

DETAILED DESCRIPTION

Hereafter, the display method and the display device according to the embodiments of the present application will be described with reference to accompany figures.

Figure 1:
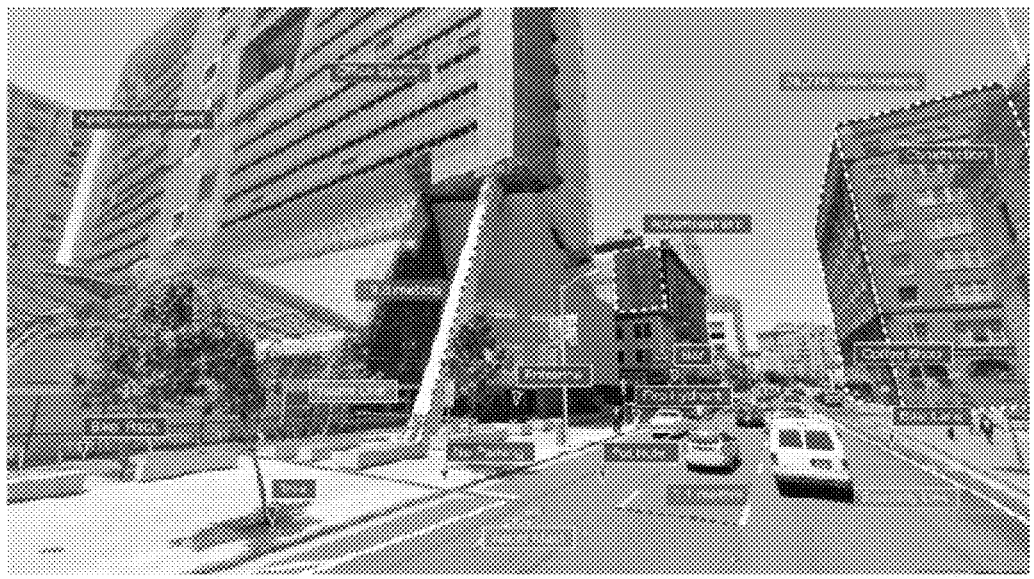
FIG. 1 schematically illustrates the effect of the AR information tagging in prior art.
Figure 2:
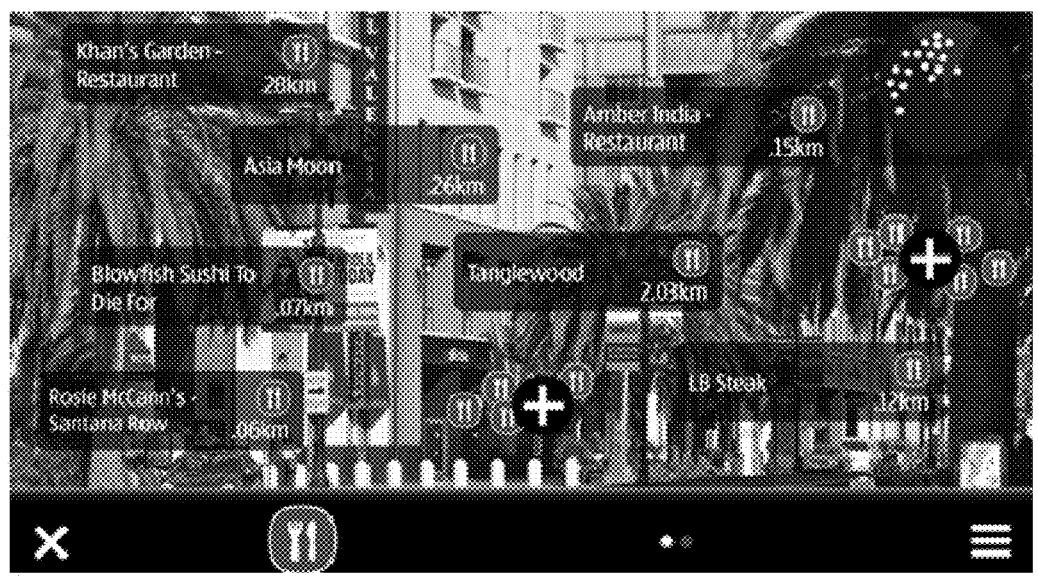
FIG. 2 schematically illustrates the difference of depths among buildings in real environment.
Figure 3:
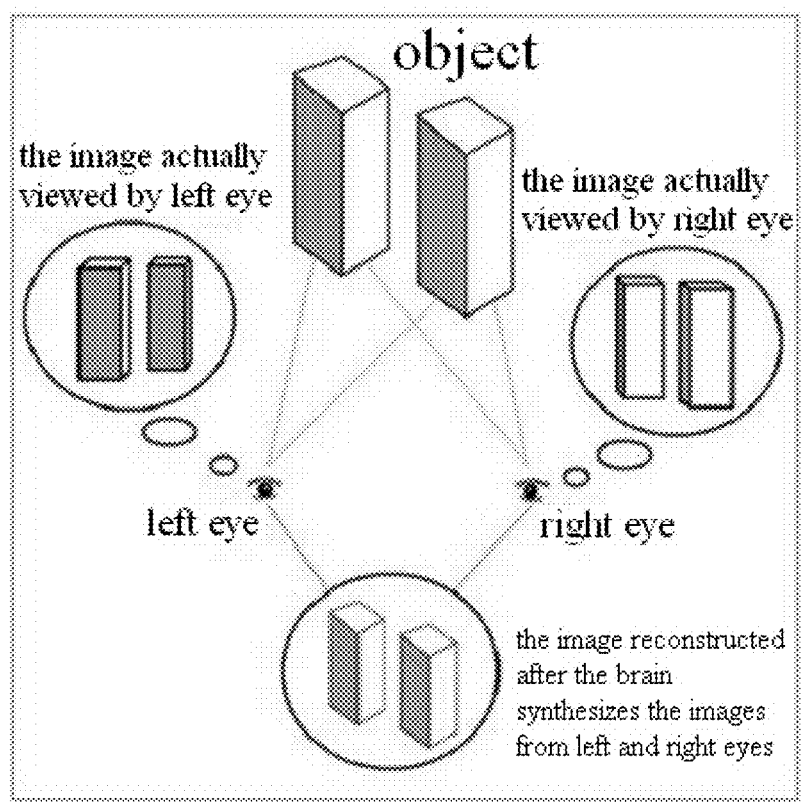
FIG. 3 schematically illustrates the principle of human eyes perceiving peripheral environment.

As shown in FIG. 3, the principle of human eyes perceiving peripheral environment is schematically illustrated. One person watches the same object with both left and right eyes, and the viewing angles of left and right eyes with respect to the object are different. Thus, images formed on retina are not exactly the same, and have differences in directions (parallax). Left and right eyes images with differences in directions produce stereo vision after being subjected to a synthesis processing of human brain, so as to enable human to perceive 3D stereo information, such as the front and the rear of the object, or the left and the right of the same.

The inventor wishes to produce 3D tagging information with the use of the above principle of human eyes perceiving 3D information of peripheral environment.

Figure 4:
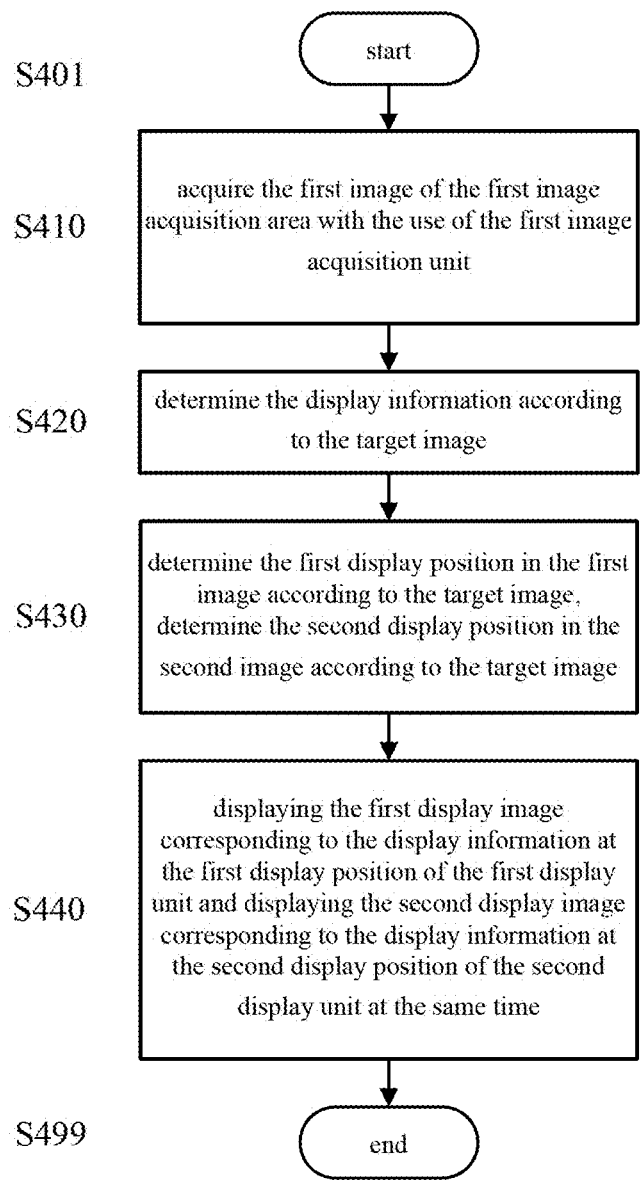
FIG. 4 illustrates detailed flowchart of the display method according to the embodiments of the present application.

Next, the display method 400 according to the embodiments of the present application will be described with reference to FIG. 4. The display method 400 is applied to an electronic device. The electronic device includes: a first display unit, which satisfies a predetermined transmittance; a second display unit, which satisfies the predetermined transmittance; a first image acquisition unit, which is set corresponding to the first display unit; a second image acquisition unit, which is set corresponding to the second display unit.

When the electronic device is put on the user, the first display unit locates within a viewable area of the user's first eye, the second display unit locates within the viewable area of the user's second eye, and the first image acquisition unit and the second image acquisition unit have an overlapping acquisition area, the overlapping acquisition area is the overlapping area of the first image acquisition area of the first image acquisition unit and the second image acquisition area of the second image acquisition unit.

Preferably, the distance between the first display unit and the first eye of the user is within a predetermined distance threshold, and the distance between the second display unit and the second eye of the user is also within the predetermined distance threshold.

For example, the electronic device is made into a pair of wearable glasses. When the user wears the wearable glasses, the first display unit locates in the viewable area of the user's left eye, for example, in front of the left eye, and the second display unit locates in the viewable area of the user's right eye, for example, in front of the right eye.

In additional, the first image acquisition unit and the second image acquisition unit are symmetric with respect to the central axis of the electronic device, and the first display unit and the second display unit are symmetric with respect to the central axis of the electronic device. Furthermore, the positional relationships of the first image acquisition unit relative to the first display unit and the position relationship of the second image acquisition unit relative to the second display unit are symmetric with respect to the central axis.

Preferably, the viewable area of the left eye is approximately overlapping with the first image acquisition area of the first image acquisition unit, and the viewable area of the right eye is approximately overlapping with the second image acquisition area of the second image acquisition unit. That is, the image acquired by the first image acquisition unit and the image viewed by the left eye are basically the same, the image acquired by the second image acquisition unit and the image viewed by the right eye are basically the same. Furthermore, preferably, the first image acquisition area of the first image acquisition unit is approximately overlapping with the second image acquisition area of the second image acquisition unit.

For example, the first image acquisition unit can be positioned above the first display unit, the second image acquisition unit can be positioned above the second display unit, and the first image acquisition unit and the second image acquisition unit are symmetric with respect to the central axis of the electronic device.

For example, the first image acquisition unit can be positioned below the first display unit, the second image acquisition unit can be positioned below the second display unit, and the first image acquisition unit and the second image acquisition unit are symmetric with respect to the central axis of the electronic device.

For example, the first image acquisition unit can be positioned on the left side of the first display unit, the second image acquisition unit can be positioned on the right side of the second display unit, and the first image acquisition unit and the second image acquisition unit are symmetric with respect to the central axis of the electronic device.

For example, the first image acquisition unit can be positioned on the right side of the first display unit, the second image acquisition unit can be positioned on the left side of the second display unit, and the first image acquisition unit and the second image acquisition unit are symmetric with respect to the central axis of the electronic device.

The display method 400 according to the embodiments of the present application starts from Step S401.

In Step S410, a first image of the first image acquisition area is acquired with the use of first image acquisition unit.

The first image includes a target image in the overlapping area, and the target image corresponds to a target object. A second image of the second image acquisition area is acquired with the use of second image acquisition unit, and the second image includes the target image in the overlapping area.

In Step S420, display information is determined in accordance with the target image.

For example, after the first image acquisition unit acquires the first image of the image acquisition area and the second image acquisition unit acquires the second image of the image acquisition area, it is possible to recognize the objects (or the object images) that appear in the first image and the second image by image recognition technology. In other words, the target objects (or the target image of the target objects) simultaneously presented on the first image and the second image are recognized by the image recognition technology.

Then, after the target objects simultaneously presented on the first image and the second image are recognized, it is possible to extract, from an information library stored in the electronic device, additional tagging information related to the recognized objects to be used as display information.

The additional tagging information may include, but not be limited to, name of building, distance between the building and the user, companies within the building, hotels within the building, or even news about the building.

Then, in Step S430, a first display position is determined in the first image in accordance with the target image, and a second display position is determined in the second image in accordance with the target image.

For example, after the display information is determined in Step S420, the first display position in the first image and the second display position in the second image should be determined next.

As described above, the present application wishes to provide the user with 3D tagging effects, and wishes to provide the 3D tagging effects to the user with the principle of human eyes perceiving 3D information of peripheral environment. Thus, corresponding first display position and second display position should be determined with association to each other in the first image and the second image.

For example, when the recognized target image is an image of a building, it is possible to determine display positions corresponding to one same geometric characteristic point of the building as the first display position and the second display position, respectively. For example, an apex of the building, a window of certain layer of the building, a label on the building and so on can be determined. For example, the display position where the upper left apex in the front of the building locates in the first image can be used as the first display position, and the display position where the upper left apex in the front of the building locates in the second image can be used as the second display position. In other words, the first display position and the second display position may correspond to one same geometric characteristic point on the target object.

Still take the recognized target image being an image of a building as an example to describe the present application. Instead of determining the display position of the geometric characteristic point on the building, it is possible to determine the display position of another object with the same depth as the building to be the first display position and the second display position, respectively. For example, the display position (next to the building) where a tree or a street sign or the like with the same depth as the building locates may be determined as the first display position in the first image and the second display position in the second image, respectively. In other words, the first display position and the second display position correspond to the same target area with the same depth as the target object.

Although it only takes the recognized target image being the image of the building as an example to describe the present application, it should be understood that it is easily to apply the present application to the target image of other target objects.

Then, in step S440, the first display image corresponding to the display information at the first display position of the first display unit and the second display image corresponding to the display information at the second display position of the second display unit are displayed at the same time, so as to enable the user to perceive the 3D display image corresponding to the display information while viewing through the first display unit by the first eye and viewing through the second display unit by the second eye.

For example, the display contents of the first display image and the second display image are the same. For example, they both have the display information. And the first display image and the second display image have the same size.

At last, the display method according to the embodiments of the present application ends in Step S499.

Hereafter, a first exemplary implementation of Step S440 according to the embodiments of the present application will be described in details with reference to FIG. 5.

In Step S510, the first display image is added at the first display position in the first image to generate a first synthesized image, and the second display image is added at the second display position in the second image to generate a second synthesized image.

The first synthesis image not only includes all the contents of the first image that the first image acquisition unit acquires, but also includes the tagging information (that is, the first display image) added at the first display position on the first image, which is determined in accordance with the recognized target image. Likewise, the second synthesis image not only includes all the contents of the second image that the second image acquisition unit acquires, but also includes the tagging information (that is, the second display image) added at the second display position on the second image, which is determined in accordance with the recognized target image.

For example, when the display device is made into a pair of wearable glasses (see-through glasses), in the case of AR information tagging application, the user wearing the wearable glasses, through the wearable glasses, can not only see objects in real world but also a tagging image displayed on the lens of the wear glasses. Thus, it is necessary to extract, from the generated first synthesis image, the first tagging image for the left eye lens and the second tagging image for the right eye lens.

Next, in Step S520, from the first synthesis image, image excluding the first image is extracted to generate the first tagging image. And from the second synthesis image, image excluding the second image is extracted to generate the second tagging image.

For those skilled in the art, how to remove the content of the first image from the first synthesis image and how to remove the content of the second image from the second synthesis image are well known. Thus, the description about the extraction procedure of the image will be omitted.

Then, in Step S530, the first tagging image is displayed on the first display unit, and the second tagging image is displayed on the second display unit.

Next, the second exemplary implementation of Step S440 according to the embodiments of the present application will be described in details with reference to FIG. 6.

In the above first exemplary implementation, the tagging information is added to the first image and the second image directly, and then the first image and the second image are removed from the first synthesis image and the second synthesis image.

On the other way, in the second exemplary implementation, the tagging information is added to the blank transparent image template directly.

Specifically, in Step S610, the first display image is added at the first display position in the first image template to generate the first tagging image. Preferably, the size of the pixel matrix on the first image template is the same as the size of the pixel matrix on the first image, so that the first image template can be used to generate the first tagging image directly, without performing image size transformation. However, the present application is not limited thereto. The size of the pixel matrix on the first image template may be greater than the size of the pixel matrix on the first image. After tagging is performed on the first image template, it is possible to extract an image portion with the same size as the size of pixel matrix on the first image from the first image template, in order to take the extracted image portion as the first tagging image.

Likewise, in Step S610, the second tagging image is added at the second display position in the second image template to generate the second tagging image. Preferably, the size of the pixel matrix on the second image template is the same as the size of the pixel matrix on the second image, so that the second image template can be used to generate the second tagging image directly, without performing image size transformation. However, the present application is not limited thereto. The size of the pixel matrix on the second image template may be greater than the size of the pixel matrix on the second image. After tagging is performed on the second image template, it is possible to extract the image portion with the same size as the size of pixel matrix on the second image from the second image template, in order to take the extracted image portion as the second tagging image.

Hereafter, in Step S620, the first tagging image is displayed on the first display unit, and the second tagging image is displayed on the second display unit.

In addition, as shown in FIG. 3, for real buildings, a regular rectangle side might be viewed as a regular rectangle by the left eye but a diamond by the right eye, due to the different viewing angles of the user. In this case, if information tagging is performed at some geometric characteristic point of the building, it is necessary to change the shape of the first display image and the second display image correspondingly.

Thus, in the display method according to the embodiments of the present application, in the case of performing information tagging at some geometric characteristic point of the building, it is also possible to recognize an information tagging plane related to the geometric characteristic point of the target object on the first image and the second image, and correspondingly transform the shape of the first display image according to the shape transformation of the information tagging plane in the first image, and correspondingly transform the shape of the second display image according to the shape transformation of the information tagging plane in the second image. That is, according to the shape of the target image in the first image and the shape of the target image in the second image, the shapes of the first display image and the second display image is correspondingly adjusted, so as to enable the user to perceive that the first display image and the second display image are well attached to the target image with 3D display effect.

As shown in the step S530 in FIG. 5 and the step S620 in FIG. 6, the first tagging image is displayed on the first display unit, and the second tagging image is displayed on the second display unit. When the first display unit and the second display unit employ certain display technology, the display manners will be different.

For example, in a case of displaying the first tagging image and the second tagging image in optical projecting way, the first display unit is a first lens and the second display unit is a second lens. The first lens and the second lens are lens with certain transparency. The first tagging image is projected on the first display unit by a first optical projection unit, and the second tagging image is projected on the second display unit by a second optical projection unit.

It should be noted that, optical paths are different for the first display unit and the second display unit. However, the first optical projection unit and the second optical projection unit can be collectively referred to as optical projection units for the ease of description.

It is different from the optical projecting way in that, for example, the first display unit and the second display unit may be transparent display devices, and tagging information display is performed by providing the first display unit with the image data of the first tagging image and providing the second display unit with the image data of the second tagging image.

Next, the display device 700 according to the embodiments of the present application will be described with reference to FIG. 7. The display device 700 includes: a first display unit 710, which satisfies a predetermined transmittance; a second display unit 720, which satisfies a predetermined transmittance; a first image acquisition unit 730, which is set corresponding to the first display unit; a second image acquisition unit 740, which is set corresponding to the second display unit; an image processing unit 750; and an image output unit 760.

When the display device 700 is put on by the user, the first display unit 710 locates within a viewable area of the user's first eye, the second display unit 720 locates within the viewable area of the user's second eye, and the first image acquisition unit 730 and the second image acquisition unit 740 have an overlapping acquisition area, the overlapping acquisition area is the overlapping area of the first image acquisition area of the first image acquisition unit 730 and the second image acquisition area of the second image acquisition unit 740.

Preferably, the distance between the first display unit 710 and the first eye of the user is within a predetermined distance threshold, and the distance between the second display unit 720 and the second eye of the user is within the predetermined distance threshold.

For example, the electronic device 600 is made into a pair of wearable glasses. When the user wears the wearable glasses, the first display unit 710 locates in the viewable area of the user's left eye, for example, in front of the left eye, and the second display unit 720 locates in the viewable area of the user's right eye, for example, in front of the right eye.

In addition, the first image acquisition unit 730 and the second image acquisition unit 740 are disposed symmetric with respect to the central axis of the display device 700, and the first display unit and the second display unit are disposed symmetric with respect to the central axis of the display device. Furthermore, the positional relationships of the first image acquisition unit relative to the first display unit 710 and the position relationship of the second image acquisition unit relative to the second display unit 720 are symmetric with respect to the central axis.

Preferably, the viewable area of the left eye is approximately overlapping with the first image acquisition area of the first image acquisition unit 730, and the viewable area of the right eye is approximately overlapping with the second image acquisition area of the second image acquisition unit 740. That is, the image acquired by the first image acquisition unit 730 and the image viewed by the left eye are basically the same, the image acquired by the second image acquisition unit 740 and the image viewed by the right eye are basically the same. Furthermore, preferably, the first image acquisition area of the first image acquisition unit 730 is also approximately overlapping with the second image acquisition area of the second image acquisition unit 740.

For example, the first image acquisition unit 730 can be positioned above the first display unit 710, the second image acquisition unit 740 can be positioned above the second display unit 720, and the first image acquisition unit 730 and the second image acquisition unit 740 are symmetric with respect to the central axis of the display device.

For example, the first image acquisition unit 730 can be positioned below the first display unit 710, the second image acquisition unit 740 can be positioned below the second display unit 720, and the first image acquisition unit 730 and the second image acquisition unit 740 are symmetric with respect to the central axis of the display device.

For example, the first image acquisition unit 730 can be positioned on the left side of the first display unit 710, the second image acquisition unit 740 can be positioned on the right side of the second display unit 720, and the first image acquisition unit 730 and the second image acquisition unit 740 are symmetric with respect to the central axis of the display device.

For example, the first image acquisition unit 730 can be positioned on the right side of the first display unit 710, the second image acquisition unit 740 is positioned on the left side of the second display unit 720, and the first image acquisition unit 730 and the second image acquisition unit 740 are symmetric with respect to the central axis of the display device.

Figure 8:
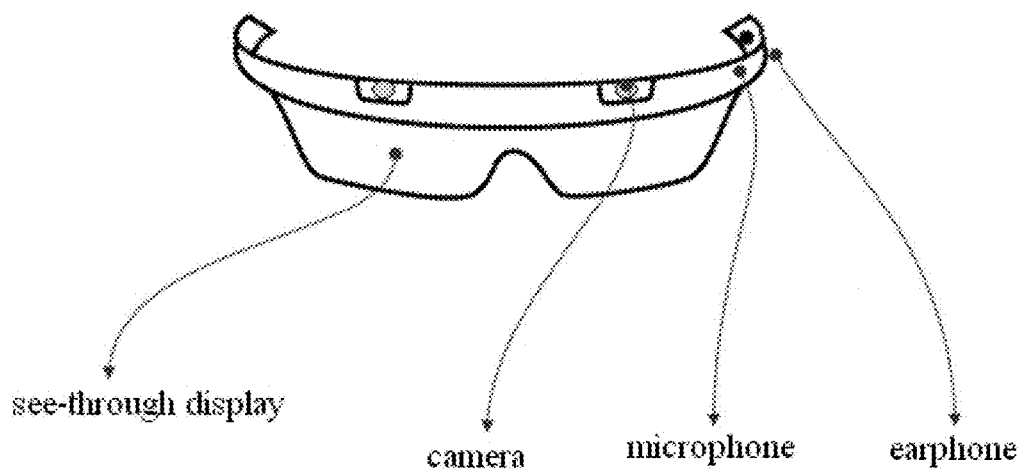
FIG. 8 illustrates an exemplary implementation the display device according to the embodiments of the present application.
Figure 9:
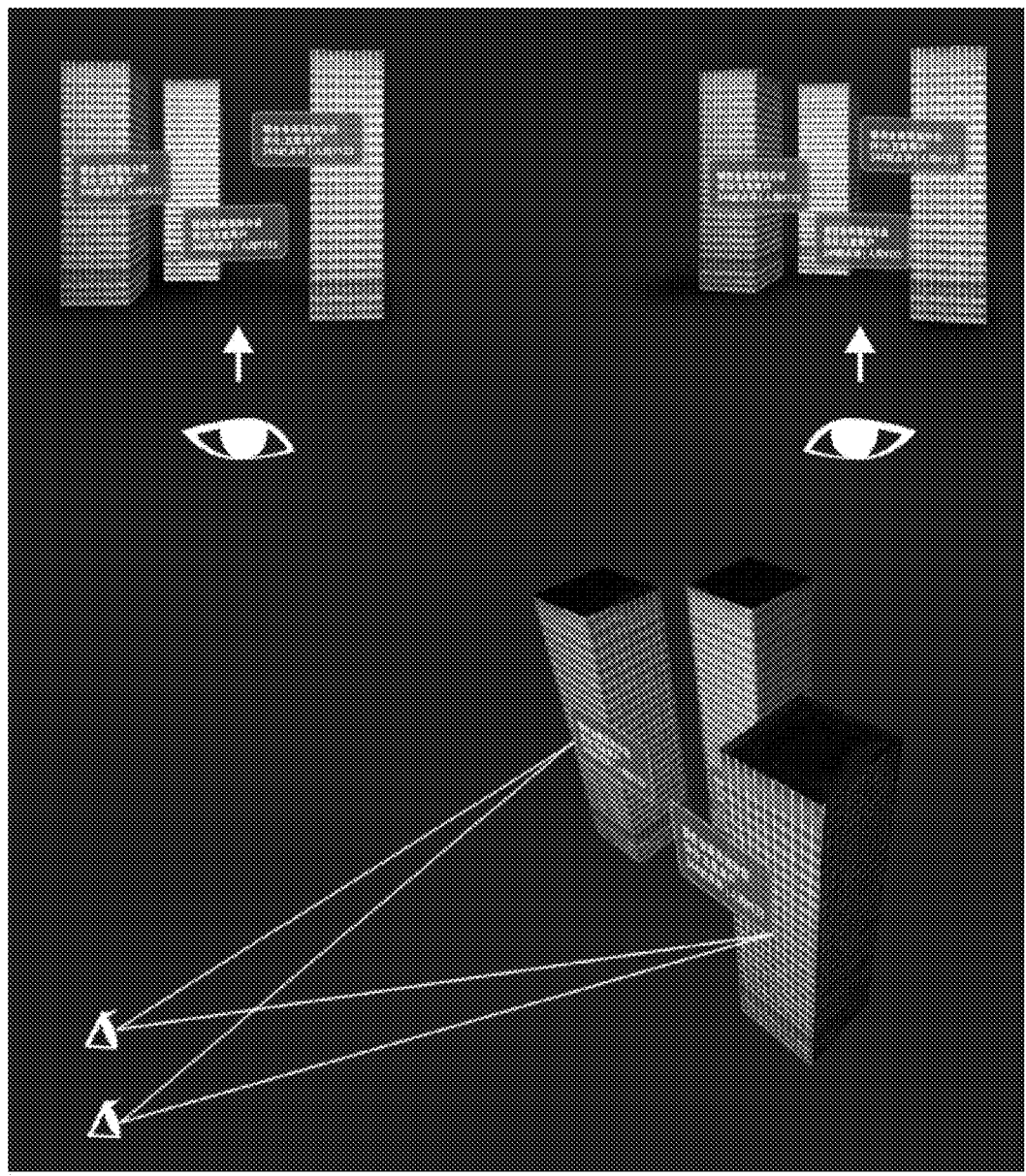
FIG. 9 illustrates a tagging image and a synthesized display image implemented by the display device according to the embodiments of the present application.

As shown in FIG. 8, an exemplary application of the display device 700 according to the embodiments of the present application serving as wearable glasses is illustrated. In FIG. 8, the first image acquisition unit 730 is shown as being above the first display unit 710, and the second image acquisition unit 740 is shown as being above the second display unit 720. The first image acquisition unit 730 and the second image acquisition unit 740 are symmetric with respect to the central axis of the wearable glasses.

The first image acquisition unit 730 acquires a first image of the first image acquisition area, wherein the first image includes a target image in the overlapping area, and the target image corresponds to a target object. The second image acquisition unit 740 acquires a second image of the second image acquisition area, the second image including the target image in the overlapping area.

The image processing unit 750 determines display information in accordance with the target image, determines, in the first image, a first display position in accordance with the target image and determines, in the second image, a second display position in accordance with the target image.

The image processing unit 750 determines the display information according to the target image as described above, and determines the first display position in the first image and the second display position in the second image according to the target image as described above.

As an example, the first display position and the second display position may correspond to the same geometric characteristic point of the target object.

As another example, the first display position and the second display position may correspond to the same target area having the same depth as the target object.

The image output unit 760 displays the first display image corresponding to the display information at the first display position of the first display unit 710 and displays the second display image corresponding to the display information at the second display position of the second display unit 720 at the same time, so as to enable the user to perceive the 3D display image corresponding to the display information while viewing through the first display unit 710 by the first eye and viewing through the second display unit 720 by the second eye.

As an example, the image processing unit 750 adds the first display image at the first display position in the first image to generate a first synthesized image, adds the second display image at the second display position in the second image to generate a second synthesized image, and extracts image excluding the first image from the first synthesis image to generate the first tagging image, extracts image excluding the second image from the second synthesis image to generate the second tagging image.

As another example, the image processing unit 750 adds the first display image at the first display position in the first image template to generate a first tagging image, the image processing unit 750 adds the second display image at the second display position in the second image template to generate a second tagging image. The size of the pixel matrix on the first image template is the same as the size of the pixel matrix on the first image, the size of the pixel matrix on the second image template is the same as the size of the pixel matrix on the second image.

Preferably, the first display image and the second display image have the same size, and display the same content.

As discussed above, in the case of performing information tagging at some geometric characteristic point of the target object, it is also possible to recognize an information tagging plane related to the geometric characteristic point of the target object on the first image and the second image, and correspondingly transform the shape of the first display image according to the shape transformation of the information tagging plane in the first image, and transform the shape of the second display image according to the shape transformation of the information tagging plane in the second image. That is, according to the shape of the target image in the first image and the shape of the target image in the second image, the shapes of the first display image and the second display image is correspondingly adjusted, so as to enable the user to perceive that the first display image and the second display image are well attached to the target image with 3D display effect.

Thus, the image processing unit 750, according to the shape of the target image in the first image and the shape of the target image in the second image, adaptively adjusts the shapes of the first display image and the second display image.

As an example, the first display unit 710 can be a first lens, the second display unit 720 can be a second lens, and the image output unit 750 can be an optical projection unit, which projects the first tagging image onto the first display unit, and projects the second tagging image onto the second display unit.

As another example, the first display unit and the second display unit are transparent display devices, wherein, the first display unit is the first lens, the second display unit is the second lens, the image output unit 750 outputs the first tagging image to the first display unit, and outputs the second tagging image to the second display unit.

Although the display method and the display device according to the embodiments of the present application have been described by way of taking a common image acquisition unit as an example, the present application is not limited thereto. The first and the second image acquisition units may be infrared image acquisition unit, and applicable to identify explosives, combustibles or the like. Corresponding display method and device may also be applicable to professional application fields, such as security check.

Although the display method and device according to the embodiments of the present application has been described by way of taking wearable glasses as an example, the present application is not limited thereto. The display method and device can be applied to not only a portable electronic device, but also a fixed device.

The display method and display device according to the embodiments of the present application advantageously provide the user with 3D information tagging, so as to enable the user to easily recognize the tagging information being which object's tagging information, improving the information tagging technology of AR.

The display method and device according to the embodiments of the present application have been described with reference to the figures above. Those skilled in the art should understand that, the present application is not limited to the above-described embodiments. Various modifications may be made without departing from the spirit of the present application, and the modifications should be included within the scope of the present application. The scope of the present application should be defined by the accompanying claims and equivalents thereof.

The invention claimed is:

1. A display method, applied to an electronic device that includes a first display unit, which satisfies a predetermined transmittance; a second display unit, which satisfies a predetermined transmittance; a first image acquisition unit, which is set corresponding to the first display unit; a second image acquisition unit, which is set corresponding to the second display unit, wherein when the electronic device is placed on a user, the first display unit locates within a viewable area of the user's first eye, the second display unit locates within the viewable area of the user's second eye, and the first image acquisition unit and the second image acquisition unit have an overlapping acquisition area, the overlapping acquisition area is the overlapping area of the first image acquisition area of the first image acquisition unit and the second image acquisition area of the second image acquisition unit, the display method includes:

acquiring a first image of the first image acquisition area with the use of first image acquisition unit, the first image including a target image in the overlapping area, and the target image corresponding to a target object;

acquiring a second image of the second image acquisition area with the use of second image acquisition unit, the second image including the target image in the overlapping area;

determining a display information in accordance with the target image;

determining a first display position in the first image in accordance with the target image;

determining a second display position in the second image in accordance with the target image; and displaying the first display image corresponding to the display information at the first display position of the first display unit and displaying the second display image corresponding to the display information at the second display position of the second display unit at the same time, so as to enable the user to perceive 3D display image corresponding to the display information while viewing through the first display unit by the first eye and viewing through the second display unit by the second eye, wherein the first display position and the second display position correspond to the same target area with the same depth as the target object.

2. The display method of claim 1, wherein, the first image acquisition unit is positioned above the first display unit, the second image acquisition unit is positioned above the second display unit, and the first image acquisition unit and the second image acquisition unit are symmetric with respect to the center of the electronic device;

the first image acquisition unit is positioned below the first display unit, the second image acquisition unit is positioned below the second display unit, and the first image acquisition unit and the second image acquisition unit are symmetric with respect to the center of the electronic device;

the first image acquisition unit is on the left side of the first display unit, the second image acquisition unit is on the right side of the second display unit, and the first image acquisition unit and the second image acquisition unit are symmetric with respect to the center of the electronic device; or the first image acquisition unit is on the right side of the first display unit, the second image acquisition unit is on the left side of the second display unit, and the first image acquisition unit and the second image acquisition unit are symmetric with respect to the center of the electronic device, wherein, the viewable area of the first eye is approximately overlapping with the first image acquisition area, and the viewable area of the second eye is approximately overlapping with the second image acquisition area.

3. The display method of claim 1, wherein, displaying the first display image corresponding to the display information at the first display position of the first display unit and displaying the second display image corresponding to the display information at the second display position of the second display unit at the same time includes:

adding the first display image at the first display position in the first image to generate a first synthesized image, adding the second display image at the second display position in the second image to generate a second synthesized image;

extracting the rest of image excluding the first image from the first synthesis image to generate the first tagging image, extracting the rest of the image excluding the second image from the second synthesis image to generate the second tagging image; and displaying the first tagging image on the first display unit, and displaying the second tagging image on the second display unit.

4. The display method of claim 1, wherein, displaying the first display image corresponding to the display information at the first display position of the first display unit and displaying the second display image corresponding to the display information at the second display position of the second display unit at the same time includes:
- adding the first display image at the first display position in a first image template to generate a first tagging image, in which the size of a pixel matrix on the first image template is the same as the size of the pixel matrix on the first image;
- adding the second display image at the second display position in a second image template to generate a second tagging image, in which the size of the pixel matrix on the second image template is the same as the size of the pixel matrix on the second image; and
- displaying the first tagging image on the first display unit, and displaying the second tagging image on the second display unit.

5. The display method of claim 1, wherein, the first display position and the second display position correspond to the same geometric characteristic point of the target object.

6. The display method of claim 5, wherein, according to the shape of the target image in the first image and the shape of the target image in the second image, the shapes of the first display image and the second display image are adjusted adaptively, in order to enable the user to perceive that the first display image and the second display image are well attached to the target image with three dimensional display effect.

7. The display method of claim 1, wherein, the first display image and the second display image have the same size, and have the same display content.

8. The display method of claim 1, wherein, the first display unit is a first lens, the second display unit is a second lens,
- displaying the first tagging image on the first display unit includes: projecting the first tagging image onto the first display unit; and
- displaying the second tagging image on the second display unit includes: projecting the second tagging image onto the second display unit.

9. The display method of claim 1, wherein, the first display unit and the second display unit are transparent display devices.

10. A display device, including:
- a first display unit, which satisfies a predetermined transmittance;
- a second display unit, which satisfies a predetermined transmittance;
- a first image acquisition unit, which is set corresponding to the first display unit;
- a second image acquisition unit, which is set corresponding to the second display unit;
- an image processing unit;
- an image output unit,
- wherein, when the display device is placed on a user, the first display unit locates within a viewable area of the user's first eye, the second display unit locates within the viewable area of the user's second eye, and the first image acquisition unit and the second image acquisition unit have an overlapping acquisition area, the overlapping acquisition area is the overlapping area of the first image acquisition area of the first image acquisition unit and the second image acquisition area of the second image acquisition unit,
- wherein, the first image acquisition unit acquires a first image of the first image acquisition area, the first image including a target image in the overlapping area, the target image corresponds to a target object; the second image acquisition unit acquires a second image of the second image acquisition area, the second image including the target image in the overlapping area;
- wherein, the image processing unit determines a display information in accordance with the target image; determines a first display position in the first image in accordance with the target image and determines a second display position in the second image in accordance with the target image;
- the image output unit displays the first display image corresponding to the display information at the first display position of the first display unit and displays the second display image corresponding to the display information at the second display position of the second display unit at the same time, so as to enable the user to perceive the 3D display image corresponding to the display information while viewing through the first display unit by the first eye and viewing through the second display unit by the second eye,
- wherein the first display position and the second display position correspond to the same target area with the same depth as the target object.

11. The display device of claim 10, wherein,
- the first image acquisition unit is positioned above the first display unit, the second image acquisition unit is positioned above the second display unit, and the first image acquisition unit and the second image acquisition unit are symmetric with respect to the center of the electronic device;
- the first image acquisition unit is positioned below the first display unit, the second image acquisition unit is positioned below the second display unit, and the first image acquisition unit and the second image acquisition unit are symmetric with respect to the center of the electronic device;
- the first image acquisition unit is on the left side of the first display unit, the second image acquisition unit is on the right side of the second display unit, and the first image acquisition unit and the second image acquisition unit are symmetric with respect to the center of the electronic device; or
- the first image acquisition unit is on the right side of the first display unit, the second image acquisition unit is on the left side of the second display unit, and the first image acquisition unit and the second image acquisition unit are symmetric with respect to the center of the electronic device,
- wherein, the viewable area of the first eye is approximately overlapping with the first image acquisition area, and the viewable area of the second eye is approximately overlapping with the second image acquisition area.

12. The display device of claim 10, wherein, the image processing unit adds the first display image at the first display position in the first image to generate a first synthesized image, adds the second display image at the second display position in the second image to generate a second synthesized image, and extracts image excluding the first image from the first synthesis image to generate the first tagging image, extracts image excluding the second image from the second synthesis image to generate the second tagging image.

13. The display device of claim 12, wherein the first display unit is a first lens, the second display unit is a second lens, the image output unit projects the first tagging image onto the first display unit, and projects the second tagging image onto the second display unit.

14. The display device of claim 12, wherein the first display unit and the second display unit are transparent display devices, and wherein, the first display unit is a first lens, the second display unit is a second lens, the image output unit outputs the first tagging image to the first display unit, and outputs the second tagging image to the second display unit.

15. The display device of claim 10, wherein,
the image processing device adds the first display image at the first display position in the first image template to generate a first tagging image, in which the size of a pixel matrix on the first image template is the same as the size of the pixel matrix on the first image;
the image processing device adds the second display image at the second display position in the second image template to generate a second tagging image, in which the size of the pixel matrix on the second image template is the same as the size of the pixel matrix on the second image.

16. The display device of claim 10, wherein, the first display position and the second display position correspond to the same geometric characteristic point of the target object.

17. The display device of claim 16, wherein, according to the shape of the target image in the first image and the shape of the target image in the second image, the image processing unit adaptively adjusts the shapes of the first display image and the second display image.

18. The display device of claim 10, wherein the first display image and the second display image have the same size, and have the same display content.

19. The display device of claim 10, wherein the display device is a wearable glass device.

* * * * *